Oct. 21, 1958 — P. SITTON — 2,857,054
SEPTIC TANK
Filed Oct. 10, 1955

INVENTOR.
PHILIP SITTON
BY Toulmin & Toulmin
Attorneys

United States Patent Office 2,857,054
Patented Oct. 21, 1958

2,857,054

SEPTIC TANK

Philip Sitton, Dayton, Ohio, assignor to The Philip Sitton Septic Tank Company, Dayton, Ohio, a corporation of Ohio Application October 10, 1955, Serial No. 539,532

4 Claims. (Cl. 210—532)

The present invention relates to septic tanks, more particularly to a concrete septic tank having a protective coating on the surfaces thereof exposed to the contents of the tank.

It is the principal of this invention to provide a method and structure for protecting concrete septic tanks against the corrosive action of the contents thereof.

It is an additional object of this invention to provide a concrete septic tank having a protective coating on all surfaces contacting the tank contents.

It is another object of this invention to minimize deterioration of the surfaces of a concrete septic tank due to the corrosive action of the contents at the junction of the tank contents, tank atmosphere and concrete surfaces.

It is a further object of this invention to provide a concrete septic tank having a polyester resin protective coating on all the surfaces thereof and extending both above and below the level of the tank contents.

Figure 1:
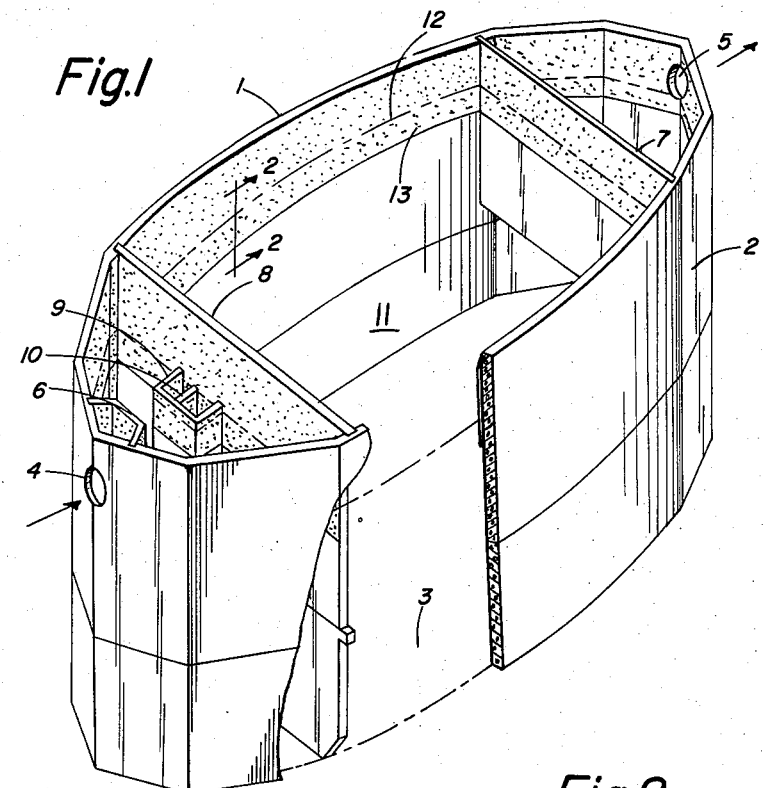
Figure 2:
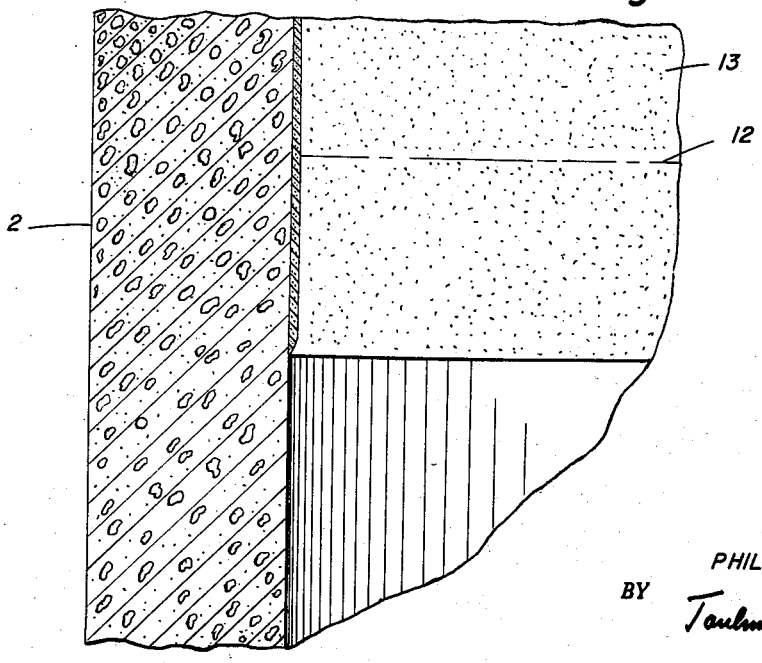

Other objects and advantages of this invention will become apparent upon reference to the accompanying description when taken in conjunction with the following drawings wherein:

Figure 1 is an over-all perspective view of the septic tank of this invention with a section of the tank wall removed; and Figure 2 is a sectional view taken along the lines 2—2 of Figure 1 and illustrated in enlarged scale.

Returning now to the drawings, more particularly to Figure 1 wherein like reference symbols indicate the same parts throughout the various views, 1 indicates a concrete septic tank. The tank 1 is elliptical in cross section.

The tank 1 comprises a vertical enclosing wall 2 and a bottom 3. While not shown in the drawing, in operation the top of the tank is generally closed.

At one end of the tank spaced downwardly from the top thereof is an inlet 4 and at the other end an outlet 5. Associated with the inlet 4 is an inlet baffle 6 and similarly cooperating with the outlet 5 is an outlet baffle 7. In addition, other baffles 8, 9 and 10 are provided. The baffles 7 and 8 form a main chamber 11 of the septic tank.

The enclosure wall 2 of the tank may be formed of a plurality of vertical members to roughly form a polygon or may be cast in a single unit at the ultimate situs of the tank.

When tank 1 is in operation, the sewage laden water is admitted to the tank through the inlet 4. During normal operation of the tank the level of the contents is indicated by the line 12. It is noted that the line 12 is immediately below the inlet and outlet 4 and 5, respectively. Thus it can be seen that with the continuing introduction of water into the septic tank, there will be a simultaneous discharge from the tank through the outlet. The circulation of the water within the tank will result in purification of the water by bacterial action upon the sewage and by settling of additional of the sewage to the bottom of the tank to form a sludge. The septic tank must be periodically cleaned in order to remove the accumulation of sludge from the bottom.

In order to prevent deterioration of the concrete walls due to the corrosive action of the contents of the septic tank, a protective coating 13 is applied to the inner face of the enclosure wall 2. In addition, this coating is placed upon each of the baffles within the tank. All concrete surfaces of the tank which are contacted by the contents are coated with the protective coating. The protective coating 13 extends from the top edge of the septic tank to below the normal level of the tank as indicated at 12. It is necessary that the protective coating extend below the level of the contents since corrosive action on the concrete occurs in the region of the level of the contents.

The protective coating comprises a polyester resin which is compatible with concrete. The rough surface of the concrete walls assists in god mechanical adherence of the protective coating to the walls of the tank. Polyester resins, such as phenol, sulfur resins, polyester-polyamide and vinyl resins may be used in order to protect against the corrosive action of the tank contents. In addition, all of the above listed coatings are impervious to moisture. Also, close adherence to the concrete surfaces is desirable in order to prevent peeling of the protective coating.

It is not necessary to completely coat the wall of the tank but may be readily done if desired. If the coating extended in the region of the bottom of the tank it may be damaged by periodic cleaning of the accumulation of sludge from the tank bottom.

While the tank described herein is constructed of concrete, it is readily apparent that septic tanks of other materials may be protected in a like manner.

It will be understood that this invention is susceptible to modification in order to adapt it to different usages and conditions, and, accordingly, it is desired to comprehend such modifications within this invention as may fall within the scope of the appended claims.

What is claimed is:

1. A tank for the continuous flow of corrosive liquid therethrough comprising a concrete receptacle having side walls and a bottom wall forming an enclosure, there being inlet and outlet means opposed from each other in said side walls to define the normal level of the tank contents, and a corrosive-resistant protective coating impervious to water on the inner faces of said side walls extending both above and below the normal level of the tank contents, said coating terminating short of the bottom of said receptacle so as not to be damaged when sludge is removed from the bottom of the tank.

2. A tank for the continuous flow of corrosive liquid therethrough comprising a concrete receptacle having side walls and a bottom wall forming an enclosure, there being inlet and outlet means opposed from each other in said side walls to define the normal level of the tank contents, and a corrosive-resistant protective coating of a polyester resin to closely adhere to the concrete surface of the receptacle and to be impervious to water on the inner faces of said side walls extending both above and below the normal level of the tank contents but terminating short of the bottom of said receptacle.

3. A tank for the continuous flow of corrosive liquid therethrough comprising a concrete receptacle having side walls and a bottom wall forming an enclosure, there being inlet and outlet means opposed from each other in said side walls to define the normal level of the tank contents, and a corrosive-resistant protective coating impervious to water on the inner faces of said side walls extending from above the normal level of the tank contents to a short distance below said normal level of tank contents.

4. A tank for the continuous flow of corrosive liquid therethrough comprising a concrete receptacle having side walls and a bottom wall forming an enclosure, there being inlet and outlet means opposed from each other in said side walls to define the normal level of the tank contents, and a corrosive-resistant protective coating impervious to water on the inner faces of said side walls and extending from the top edges of said side walls to a short distance below the normal level of the contents of the tank.

References Cited in the file of this patent

UNITED STATES PATENTS

| | | |
|---|---|---|
| 1,160,363 | Baekland | Nov. 16, 1915 |
| 1,574,603 | Burtis | Feb. 23, 1926 |
| 2,483,564 | Sitton | Oct. 4, 1949 |
| 2,718,829 | Seymour et al. | Sept. 27, 1955 |
| 2,751,775 | Sergovic | June 26, 1956 |

FOREIGN PATENTS

| | | |
|---|---|---|
| 914,510 | France | June 17, 1946 |

OTHER REFERENCES

American Builder, August 1955, page 198.

"Modern Plastics," October 1947, pages 11 to 115.

Concrete Sealed by Glass Cloth and Resin, by John Delmonte, published in "Concrete," June 1949, pages 12 and 45.